(12) United States Patent
De Laet et al.

(10) Patent No.: US 11,493,124 B2
(45) Date of Patent: Nov. 8, 2022

(54) BRANCHED LUBRICANT LINE

(71) Applicants: ZF Friedrichshafen AG, Friedrichshafen (DE); ZF Wind Power Antwerpen N.V., Lommel (BE)

(72) Inventors: Wim De Laet, Antwerp (BE); Pieter Uytterhoeven, Friedrichshafen (DE); Maarten Gernaey, Friedrichshafen (DE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 17/291,615

(22) PCT Filed: Oct. 7, 2019

(86) PCT No.: PCT/EP2019/077007
§ 371 (c)(1),
(2) Date: May 6, 2021

(87) PCT Pub. No.: WO2020/094305
PCT Pub. Date: May 14, 2020

(65) Prior Publication Data
US 2022/0010875 A1 Jan. 13, 2022

(30) Foreign Application Priority Data
Nov. 9, 2018 (DE) .................... 10 2018 219 140.9

(51) Int. Cl.
| | |
|---|---|
| *F16H 57/04* | (2010.01) |
| *F16H 57/08* | (2006.01) |
| *F16D 1/10* | (2006.01) |

(52) U.S. Cl.
CPC ....... *F16H 57/0482* (2013.01); *F16H 57/043* (2013.01); *F16H 57/046* (2013.01);
(Continued)

(58) Field of Classification Search
None
See application file for complete search history.

(56) References Cited

U.S. PATENT DOCUMENTS

| | | | |
|---|---|---|---|
| 10,337,602 B2 | 7/2019 | Hepermann | |
| 2006/0068961 A1* | 3/2006 | Haka | F16H 57/0479 475/159 |

(Continued)

FOREIGN PATENT DOCUMENTS

| | | |
|---|---|---|
| DE | 8535076 U1 | 2/1986 |
| DE | 102009034833 A1 | 2/2011 |

(Continued)

*Primary Examiner* — Timothy Hannon
(74) *Attorney, Agent, or Firm* — Leydig, Voit & Mayer, Ltd.

(57) ABSTRACT

A transmission includes at least one planetary gear stage with a planet carrier having a first toothing. The transmission further includes at least one lubricant line having a first outlet opening and a second outlet opening. The first toothing, together with a second toothing, forms a spline. The first outlet opening is configured to lubricate the spline, and the second outlet opening is configured to lubricate a sun gear of the planetary gear stage.

4 Claims, 1 Drawing Sheet

(52) U.S. Cl.
CPC ....... *F16H 57/0456* (2013.01); *F16H 57/082* (2013.01); *F16D 2001/103* (2013.01); *F16D 2300/06* (2013.01)

(56) References Cited

U.S. PATENT DOCUMENTS

| | | |
|---|---|---|
| 2016/0223073 A1 | 8/2016 | Deitmers et al. |
| 2016/0290480 A1 | 10/2016 | Sada et al. |
| 2018/0274663 A1* | 9/2018 | Hepermann ............ F03D 15/00 |

FOREIGN PATENT DOCUMENTS

| | | | |
|---|---|---|---|
| DE | 102009031320 A1 | 3/2011 | |
| DE | 102015217906 A1 | 3/2017 | |
| DE | 102016202533 A1 | 8/2017 | |
| EP | 0164968 A1 | 12/1985 | |
| EP | 2280193 A2 | 2/2011 | |
| EP | 3008355 B1 | 1/2018 | |
| JP | H0544818 A * | 2/1993 | ......... F16H 57/0479 |

\* cited by examiner

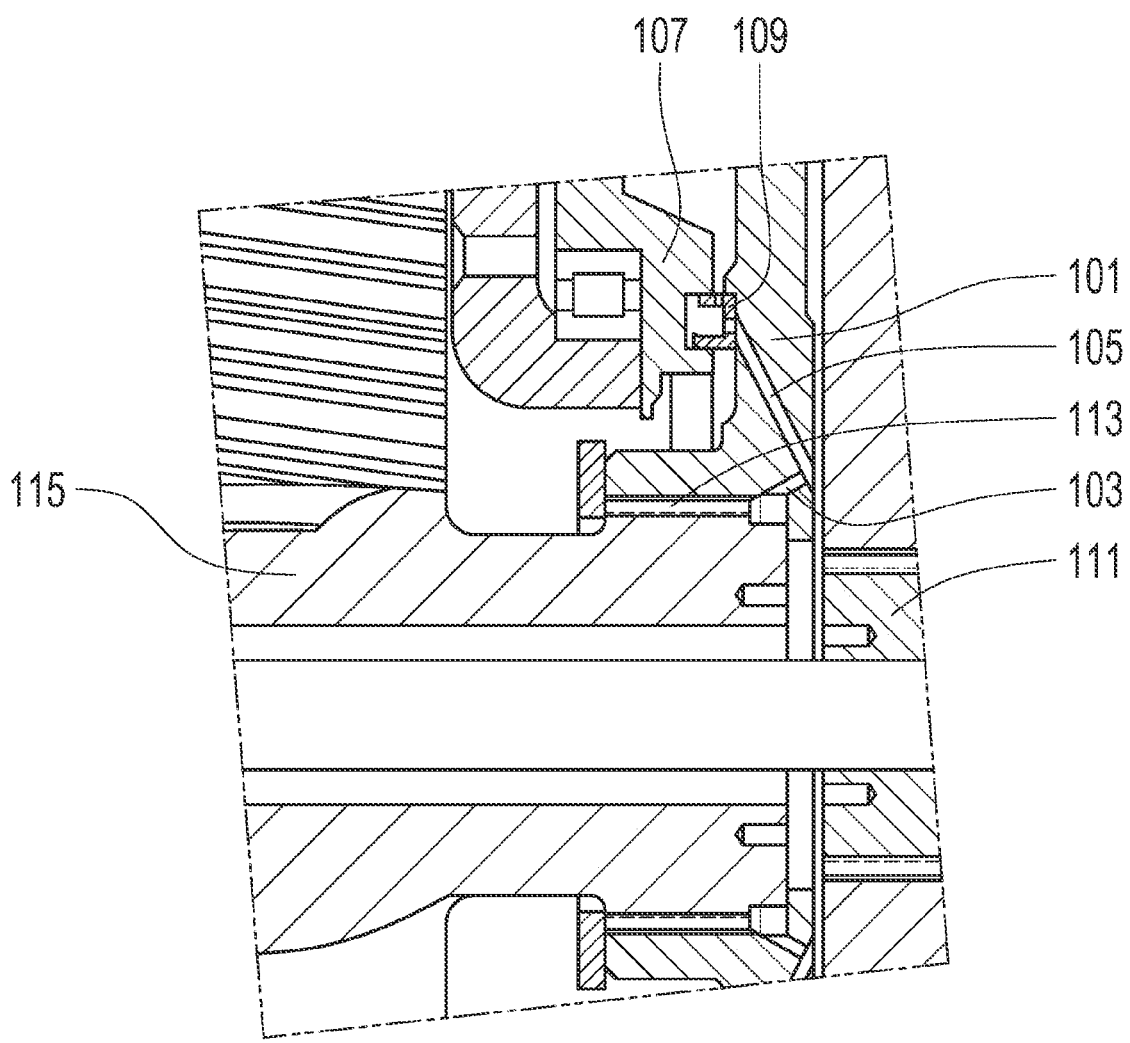

BRANCHED LUBRICANT LINE

CROSS-REFERENCE TO PRIOR APPLICATIONS

This application is a U.S. National Phase Application under 35 U.S.C. § 371 of International Application No. PCT/EP2019/077007, filed on Oct. 7, 2019, 20, and claims benefit to German Patent Application No. DE 10 2018 219 140.9, filed on Nov. 9, 2018, 20. The International Application was published in German on May 14, 2020 as WO 2020/094305 under PCT Article 21(2).

FIELD

The present disclosure relates to a transmission having at least one planetary gear stage with a planet carrier having a first toothing and a second toothing that form a spline and at least one lubricant line having a first outlet opening designed to lubricate the spline.

BACKGROUND

A transmission having oil ducts for pressure lubrication of a toothed coupling with an axial contact surface is known from EP 3 008 355 B1.

SUMMARY

In an embodiment, the present invention provides a transmission including at least one planetary gear stage with a planet carrier having a first toothing. The transmission further includes at least one lubricant line having a first outlet opening and a second outlet opening. The first toothing, together with a second toothing, forms a spline. The first outlet opening is configured to lubricate the spline, and the second outlet opening is configured to lubricate a sun gear of the planetary gear stage.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

The FIGURE provides a sectional view of a planet carrier.

DETAILED DESCRIPTION

The present disclosure provides for improving the supply of lubricant to a transmission.

According to a first aspect, the disclosure provides a transmission.

The transmission has at least one planetary gear stage. A planet carrier of the planetary gear stage forms a first toothing and at least one lubricant line. The first toothing, together with a second toothing, forms a spline. The second toothing is formed by a further component of the transmission. The second component may, for example, be a sun shaft of another planetary gear stage.

The toothings of a spline are coaxially aligned and engage with one another. A rotationally fixed connection between the toothings thereby materializes. In the present instance, there is therefore a rotationally fixed connection between the first toothing and the second toothing, and thus between the planet carrier and the further component.

In addition to the first outlet opening, the lubricant line has an inlet opening and a second outlet opening. The openings are connected to one other so as to conduct lubricant. The inlet opening is integrated into a lubricant circuit of the transmission in such a way that lubricant is introduced into the lubricant line through the inlet opening.

The lubricant line branches. A first part of the lubricant introduced into the lubricant line is thus conducted to the first outlet opening and there exits from the lubricant line. A second part of the lubricant introduced into the lubricant line is conducted to the second outlet opening and there exits from the lubricant line.

The first outlet opening is designed to lubricate the spline. It is arranged in such a way that the exiting lubricant arrives at a space between the first toothing and the second toothing.

The second outlet opening is designed to lubricate a sun gear, or a toothing of the sun gear, of the planetary gear stage. The second outlet opening is thus oriented in such a way that lubricant which exits from the second outlet opening arrives at least in part at the toothing of the sun gear.

Both the spline and the toothing of the sun gear are lubricated with a single lubricant line formed by the planet carrier. This simplifies the design of the lubricant circuit.

In a preferred development, the second outlet opening is designed as a spray nozzle. By the lubricant exiting from the second outlet opening being sprayed onto the toothing of the sun gear, a gap between the second outlet opening and the sun gear can be bridged.

The first outlet opening may also be designed as a spray nozzle. In this case, the lubricant from the first outlet opening would be sprayed onto the spline such that at least a portion of the lubricant arrives at the space between the first toothing and the second toothing.

However, the first outlet opening is preferably further developed in order to supply the spline with lubricant by means of pressure lubrication. This means that a lubricant- and pressure-conducting connection exists between the first outlet opening and the spline, or between the first outlet opening and the space between the first toothing and the second toothing. Such a connection can be realized by an arrangement whereby the first outlet opening and the spline directly adjoin each other.

In a preferred development, the lubricant line comprises a first hole and a second hole. In particular, the lubricant line may consist of the first hole and the second hole. The first hole forms the first outlet opening and opens into the second hole, or into a side face of the second hole. A first opening of the first hole is accordingly identical to the first outlet opening. A second opening of the first hole is located in the side face of the second hole. The second hole forms the inlet opening and the second outlet opening of the lubricant line. The production of the lubricant line is simplified by the two holes opening into one another.

The first hole and the second hole are preferably developed with different diameters. Due to the different diameters, the proportions of the lubricant which are discharged for lubricating the spline and the further component can be specifically determined.

The planet carrier 101 shown in the FIGURE has a first hole 103 and a second hole 105. Lubricant that is supplied via a transmission housing 107 arrives at the second hole via a transfer ring 109.

The second hole 105 is arranged such that a portion of the lubricant sprays out of an outlet opening of the second hole 105 onto a sun gear 111.

The sun gear 111 belongs to the same planetary gear stage as the planet carrier 101.

The first hole 103 branches off from the second hole 105. A further part of the lubricant thereby flows via the second hole 103 into a spline 113 which is formed by a sun shaft 115 of an upstream planetary gear stage and the planet carrier 101.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

101 Planet carrier
103 First hole
105 Second hole
107 Transmission housing
109 Transfer ring
111 Sun gear
113 Spline
115 Sun shaft

The invention claimed is:

1. A transmission, comprising:
a planetary gear stage including a planet carrier having a first toothing, wherein the first toothing, together with a second toothing, forms a spline;
at least one lubricant line having a first outlet opening and a second outlet opening; wherein the first outlet opening is configured to lubricate the spline,
wherein the second outlet opening is configured to lubricate a sun gear of the planetary gear stage,
wherein the at least one lubricant line includes a first passage and a second passage,
wherein the first passage forms the first outlet opening and opens directly into the second passage, and
wherein the second passage extends from an inlet opening to the second outlet opening.

2. The transmission according to claim 1, wherein the second outlet opening is a spray nozzle.

3. The transmission according to claim 1, wherein the first outlet opening is configured for pressure lubrication of the spline.

4. The transmission according to claim 1, wherein a diameter of the first passage and a diameter of the second passage differ.

* * * * *